Dec. 20, 1938.                L. A. HEYMANN                2,140,743
                    HOLDER FOR BEVERAGE RECEPTACLES
                          Filed Jan. 8, 1938
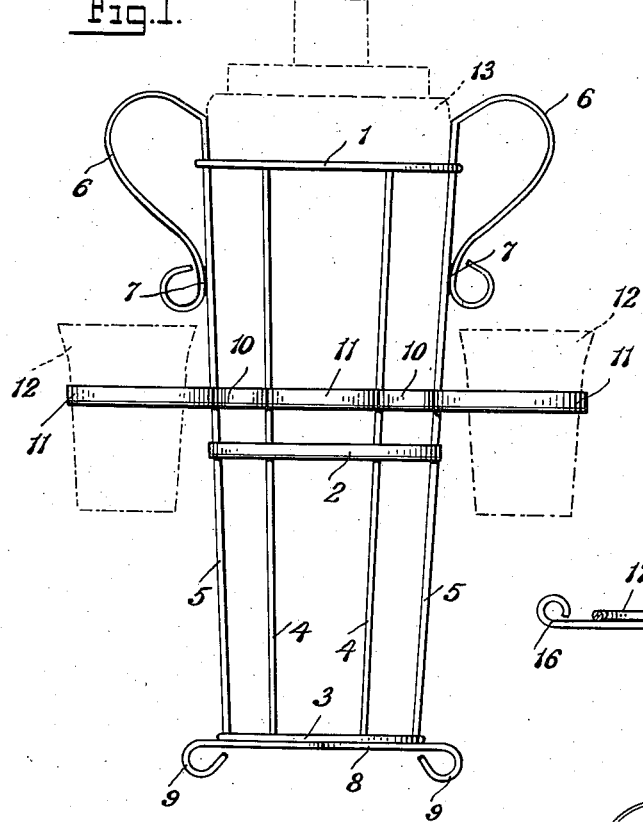
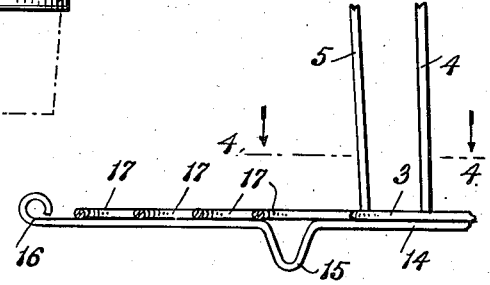
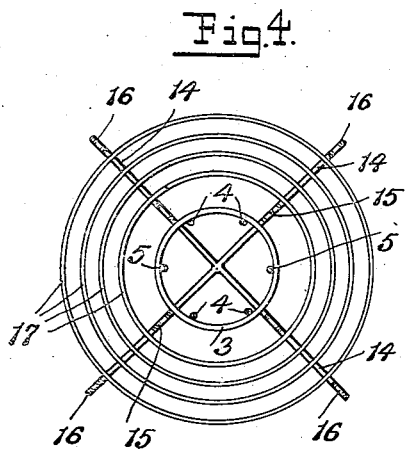
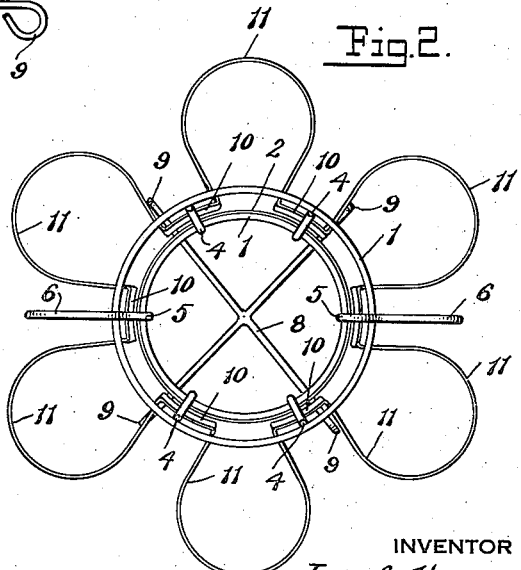
INVENTOR
Leo A. Heymann
BY
Benedict J. Wise
ATTORNEY Patented Dec. 20, 1938

2,140,743

UNITED STATES PATENT OFFICE 2,140,743

HOLDER FOR BEVERAGE RECEPTACLES

Leo A. Heymann, New York, N. Y.

Application January 8, 1938, Serial No. 184,019

3 Claims. (Cl. 211—74)

This invention has reference to holders for beverage receptacles and has for its object the provision of a holder by which a beverage container, such as a cocktail shaker, vacuum bottle or the like, and a plurality of drinking glasses may be conveniently unitarily supported and easily carried whereby the serving of drinks, or drinks, food and other refreshments may be greatly facilitated.

More particularly, the invention contemplates the provision of a cage-like holder within which a beverage receptacle is supported, said holder being provided with one or more integrally formed handles and having a rack formed with a plurality of radially-extending loops projecting laterally from the sides of the holder for the reception and support of a plurality of drinking glasses.

A further object of the invention is to provide an article of the character mentioned wherein the lower portion of the supporting structure is of tray-like formation whereby a suitable support for sandwiches, articles of food, cigarettes or the like will be provided, thus enabling the device to be not only used for the support of a beverage container and drinking glasses but for other articles as well.

In the accompanying drawing, wherein an embodiment of the invention is shown, Fig. 1 is a side elevation of the receptacle support; Fig. 2 is a plan view of the same; Fig. 3 is a side elevation, with parts in section, of the lower portion of a modified structure showing the provision of a tray, and Fig. 4 is a sectional view on the line 4—4 of Fig. 3, looking in the direction of the arrows.

The main portion of the holder consists of a cage-like portion intended to removably receive a beverage receptacle 13, such as a cocktail shaker, vacuum bottle or the like, the general shape of the holder being dependent upon the shape and size of the receptacle which it is intended to accommodate. In the drawing, the central cage-like portion consists of the three annular brace members or rings 1, 2 and 3 which extend about and are secured in spaced relationship to the uprights 4 and 5, thus forming a cylindrical enclosure for the reception of the receptacle or bottle 13. A bottom for the cage-like enclosure thus formed is provided by the crossed rods or wires 8 which have their ends extending radially beyond the lower ring 3, and curled as indicated at 9 to form supporting feet for the holder, permitting it to firmly rest upon a table or other surface.

The upper ends of the upright members 5 are extended above the upper ring 1 and are curled or looped at 6 to provide carrying handles, the lower portions of which are firmly attached at 7 to the uprights 5 to greatly stiffen and strengthen the handles thus provided.

The glass supporting member or rack consists of a continuous annular section of strip metal, bent sinuously as clearly disclosed in Fig. 2, to form it into a plurality of loops 11, spaced apart, and separated by the intermediate portions 10 which are firmly attached to the outer faces of the uprights 4 and 5 by being soldered, welded or otherwise attached thereto. The loops 11 are of such shape and formation that they each removably receive and support a drinking glass or similar receptacle 12 as clearly shown in Fig. 1.

The number of loops in the rack, the position which the rack occupies on the holder, and the shape of the loops for the accommodation of the glasses may be varied as will be readily understood. It is also possible to utilize several glass racks in superposed relationship, particularly when small liqueur glasses are used.

In Fig. 3 a modified structure is shown, wherein the lower portion of the holder is provided with the bottom members 14, corresponding in function to those indicated at 8, but extended laterally to co-operate in the formation of a supporting tray. The radially extended portions of members 14 are upturned or rolled at their extremities, as indicated at 16, and at a suitable point between the lower ring 3 and these extremities, supporting feet 15 are formed by distorting members 14 downwardly as clearly shown in Fig. 3. The position of these supporting feet 15 is dependent upon the extent of projection of the members 14, or in other words upon the size of the tray provided. Spaced annular wires 17, concentrically disposed, are secured on top of the members 14, as clearly shown in Fig. 4 and co-operate with the members 14 in the formation of the supporting tray.

With the structure described it will be apparent that great convenience will be had in handling and serving drinks, or drinks, food, cigarettes or other refreshments, since a beverage receptacle, glasses, food, cigarettes or the like may be unitarily supported and carried wherever desired. The glasses are safely suspended in the rack away from the possibility of breakage, and the body of the beverage receptacle is protected by the cage-like wire enclosure in which it is supported.

It will be understood that various modifications may be made in the structure without departing from the spirit of the invention as expressed in the claims appended hereto.

What I claim is:

1. An article of the character described comprising a central frame forming a cage-like holder for a beverage receptacle, said holder having a plurality of vertically extended braces, a continuous member extending completely around the holder and attached at spaced points to said braces and forming a rigidifying member, said member being formed with a plurality of loops extending laterally from the holder, each of said loops being shaped to receive and support a drinking glass.

2. An article of the character described comprising a central frame forming an open-top cage-like holder for the reception of a beverage receptacle, said holder including a plurality of spaced uprights, a continuous band of flat strip material extending completely around the holder and attached at spaced points to said uprights to rigidify the holder, said band being distorted outwardly between its points of attachment to the uprights, the outwardly distorted portions constituting loops each of which is shaped to receive and support a drinking glass.

3. An article of the character described comprising a wire cage-like holder for the reception of a beverage or similar receptacle, said holder including a plurality of spaced upright supporting wires, said holder having a bottom composed of crossed wires, said bottom wires having their end portions extended beyond the receptacle and curled in loop formation to form supporting feet for the holder, an annular band in the form of a continuous loop completely extending around the holder and secured to the upright supporting wires and serving as a ridigifying element, said band being outwardly distorted at intervals to form radially disposed loops for receiving and holding drinking receptacles in a position of suspension from the holder.

LEO A. HEYMANN.